Aug. 29, 1961  R. G. WATSON  2,998,090
SYSTEM FOR COMPENSATION OF LOAD CELL NON-LINEARITY
Filed April 20, 1956  4 Sheets-Sheet 1

INVENTOR.
ROBERT G. WATSON
BY Robert S. Dunham
ATTORNEY

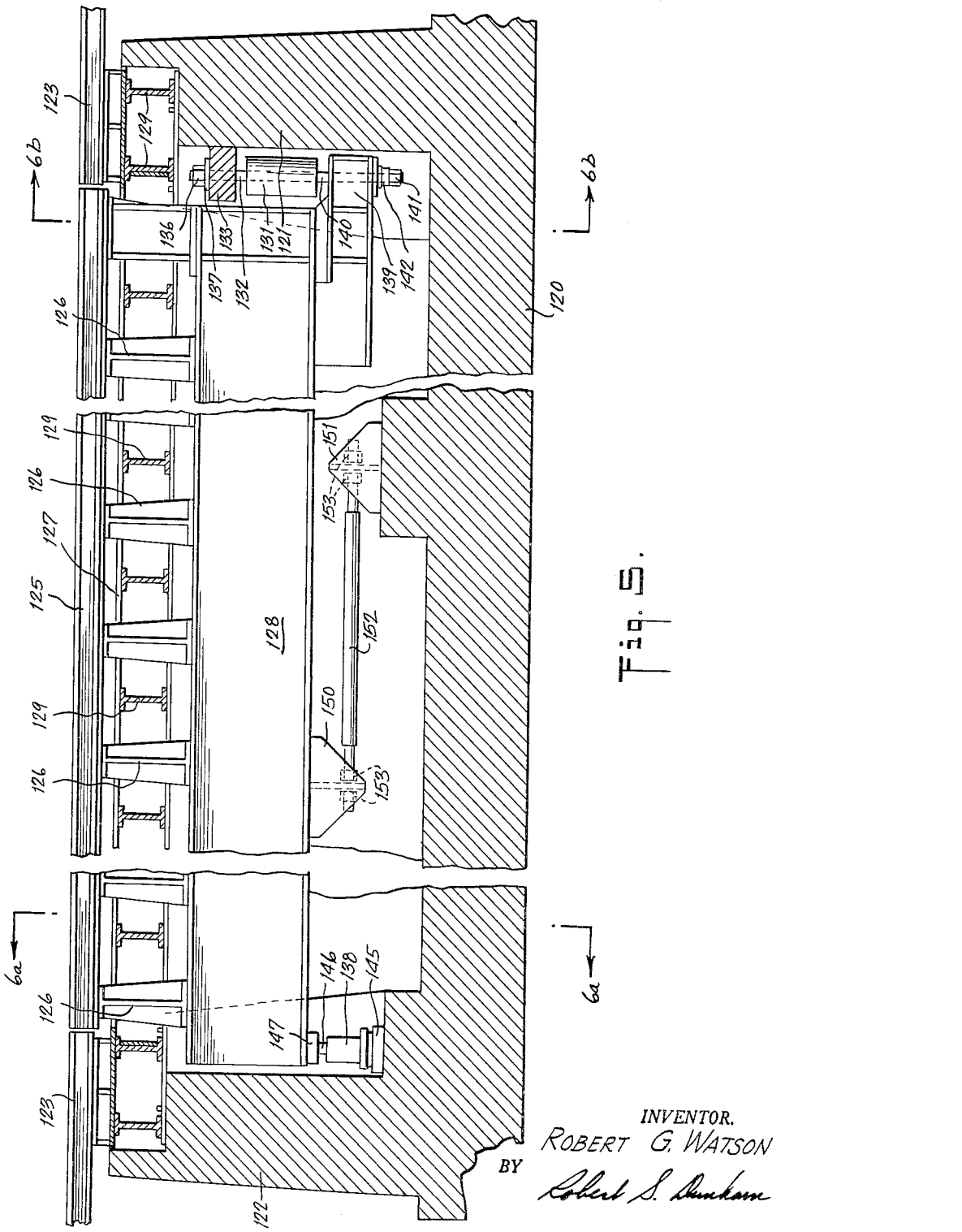

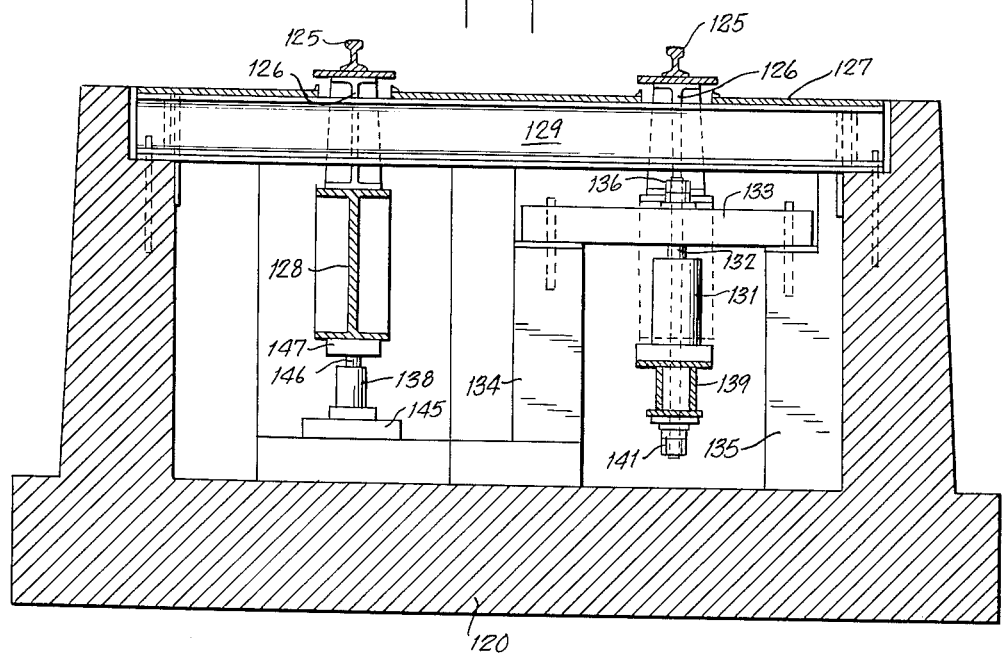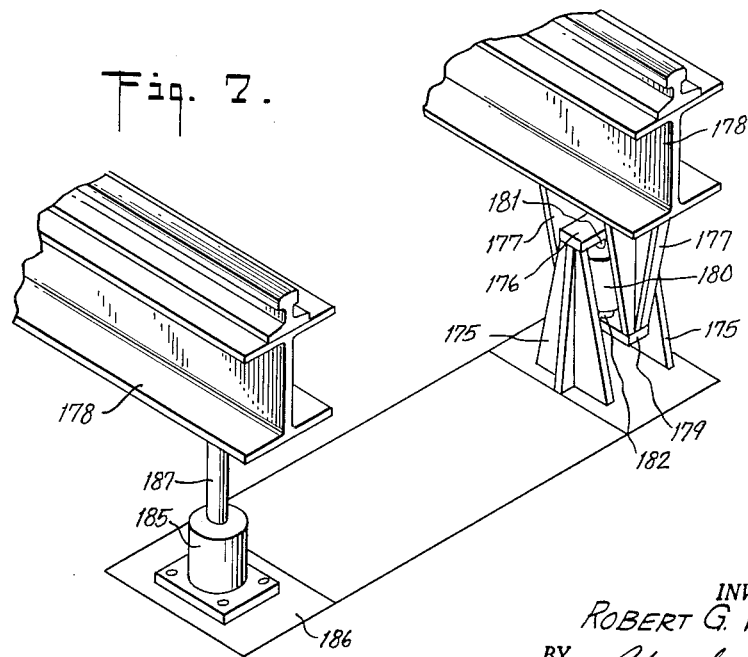

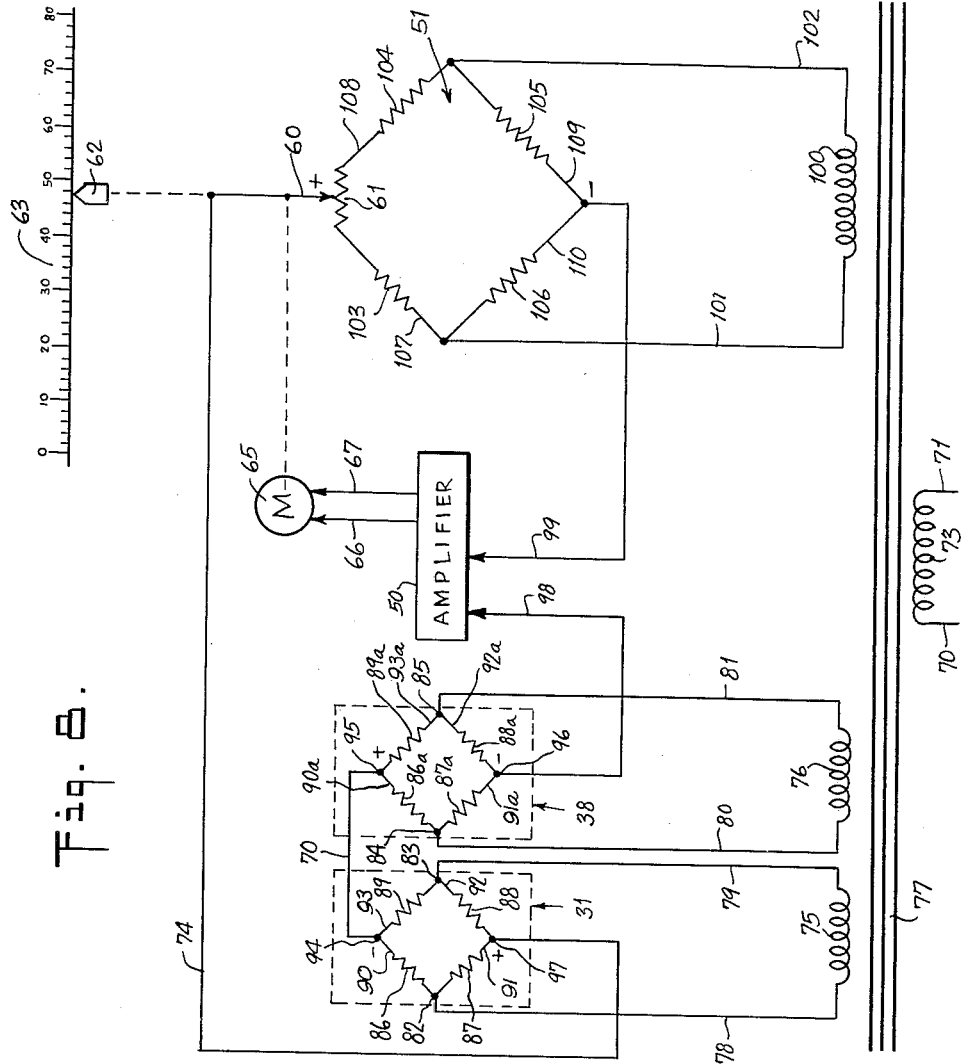

United States Patent Office 2,998,090
Patented Aug. 29, 1961

2,998,090
SYSTEM FOR COMPENSATION OF LOAD CELL NON-LINEARITY
Robert G. Watson, Euclid, Ohio, assignor to Republic Steel Corporation, Cleveland, Ohio, a corporation of New Jersey
Filed Apr. 20, 1956, Ser. No. 579,547
6 Claims. (Cl. 177—211)

This invention relates to apparatus for weighing loads, and more particularly relates to a system for compensating for non-linearity of output of weighing load cells.

Since the development of the strain gauge type of load cell, it has been possible to weigh loads by measuring the strain change induced in a load sensitive element in response to a given axially applied load. These gauges have proved to be of considerable usefulness in weighing great loads. However, it has been found that the load cells or strain gauges have a curved output rather than an output which is a linear function of the applied load. The deviation from the linear function is tangent at zero input and becomes progressively more pronounced under application of loads.

This parabolic output is found in both the tension and compression cells. However, it has been observed that the response curve in tension is substantially complementary of the response curve in compression.

Therefore, it is an object of this invention to employ load cells in compression and in tension to realize or approach absolute linearity for measuring the load to provide a more accurate weighing means.

A further object of this invention is to provide compression and tension load cells in such juxtaposition that when a load is applied, the weight is distributed substantially equally between the cells so that the proportional electric voltage output of the two can be used in combination to obtain a substantially linear output.

A still further object of the invention is to position tension and compression load cells for weighing on a scale platform upon which the load may be unevenly distributed in such manner that the non-linear outputs of individual cells will be compensated for by complementary non-linear outputs of other load cells to produce a substantially linear output for accurate measurement of the load on the platform.

The invention comprises, generally, a system of weighing loads in which the load is supported equally by a load cell under tension and a load cell under compression so that the complementary non-linear outputs from the compression and tension cells when combined may be balanced against each other to obtain a substantially linear output which is directly proportional to the weight of the supported load.

The invention also includes a means for combining the tension and compression load cells so that the weight may be equally distributed between the tension and compression load cells and also the invention contemplates a means of distributing or positioning the load cells to support a platform scale of large dimensions which is subject to uneven loading so that the non-linear output of each individual cell is combined with the complementary non-linear output of another individual cell in any given area of the platform.

For a more complete description of the invention, reference is made to the drawings wherein:

FIG. 5 is a longitudinal section of a roalroad track scale apparatus, showing another form of the invention;

FIG. 6 is a cross-section of the track scale, as taken along either the line 6a—6a or the line 6b—6b in FIG. 5;

FIG. 7 is a fragmentary perspective view of one end of a track scale of slightly modified form; and FIG. 8 is a circuit diagram for interpreting signal from the weighing cells.

Figure 1:
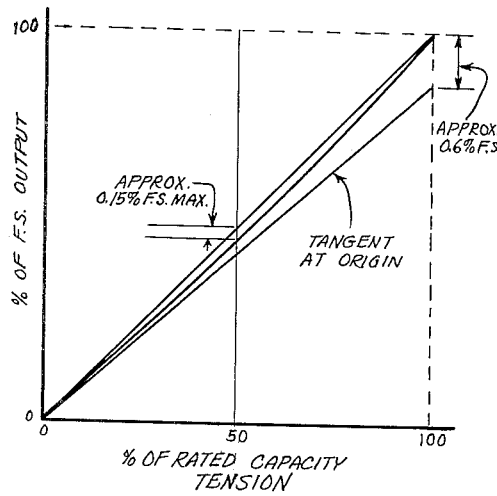
FIG. 1 is the output response curve of a load cell under tension.

Tests have indicated that when a strain gauge or load cell, such as the commercial load cells of the type disclosed in Patent No. 2,561,318, are subjected to a load under tension, the curve of output is non-linear and has been found to be a curved line when plotted. As indicated in FIG. 1, the deviation from linear output at 50% of the rated capacity (in tension) is approximately 0.15% F.S. (full scale).

Figure 2:
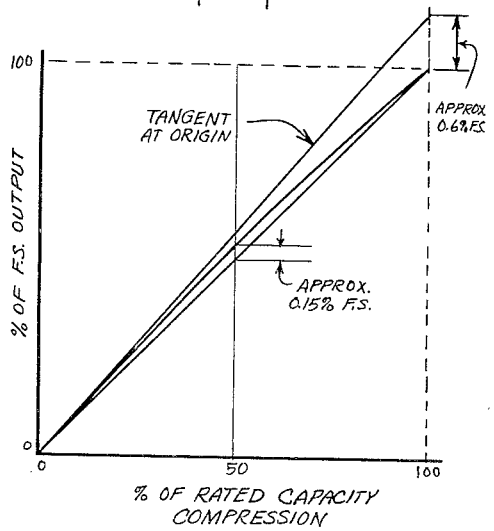
FIG. 2 is the output response curve of a load cell under compression.

From FIG. 2, it will be noted that a cell which is subjected to compression also has a non-linear output response curve which, for the rated capacity, deviates from linear output to the same degree as measured relative to the full scale (F.S.) output, but in the opposite direction from the load cell in tension. The parabolic output curve for the load cell in tension curves upward from a line which is tangent to the parabolic output curve at zero capacity and zero output (see FIG. 1), whereas the parabolic output curve of the load cell under compression curves down and away from a line tangent to the curve at zero capacity of F.S. output (see FIG. 2).

Figure 3:
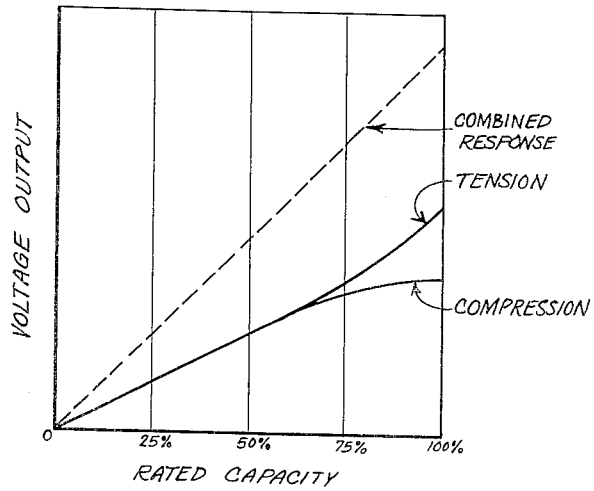
FIG. 3 is the combined output response curves of tension and compression load cells.

FIG. 3 illustrates the combined response of a compression cell and a tension cell in which the combined response is a linear function of the applied load, the points on the line of combined response being the sum of the absolute values of voltage output for the two cells. In FIG. 3, it will be understood that the vertical coordinate represents a slightly different quantity (actual voltage output) from that of FIGS. 1 and 2 (percent of full scale output) although of similar significance, and the plotting scale has been made somewhat different for convenience of illustration of the combined response line.

It is particularly desirable that the load cell output be a linear function of the applied load if the load is to be indicated on an evenly graduated dial, also if multiple cells are used and loading is distributed in different proportions on various cells. It will be observed that the response curve of the load cell in tension is substantially a complementary, or a mirror, image of the response curve of the cell in compression. Therefore, to obtain an output which is a linear function of the applied load, this invention contemplates a system of weighing wherein the load is supported equally between a load cell in compression and a load cell in tension.

Figure 4:
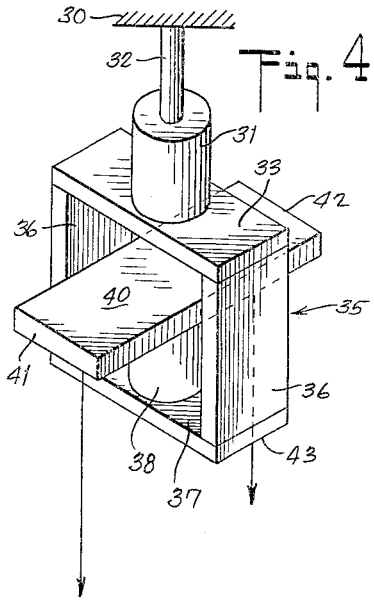
FIG. 4 is a perspective view of one form of load supporting apparatus, embodying the invention.

FIG. 4 is a schematic perspective view showing one means of combining the cells to support the weight substantially equally between them. 30 indicates generally a support for the apparatus. A tension load cell 31 is connected to the support by any suitable means, such as welding or bolting the column 32 of the cell to the support. The other end of the cell 31 is connected to the upper cross arm 33 of the yoke member 35. Vertical side arms 36 of the yoke member connect the upper cross arm 33 with a lower cross arm 37 of the yoke member. A compression cell 38 is supported on the lower cross arm 37 and a load carrying beam 40 is carried on the upper end of the compression load cell 38. The load is suspended and equally supported from the ends 41, 42 of the load carrying beam 40. It will be appreciated that by this arrangement, the cell 31 is loaded in tension and the weighing cell 38 is loaded in compression and the weight of load is supported substantially equally by the two cells in series; the load on each is necessarily similar to the load on the other. The sum of the combined output of the two load weighing cells provides a linear function of the applied load on the cells, it being understood that the capacity and voltage output of the load cells will be the same and that the load cells, therefore, are matched and are equally rated.

The voltage output from the two load cells may be interpreted in a suitable circuit and the weight may be indicated by a pointer moving over a dial or by any suitable means of indicating or recording the weight.

In FIG. 8, a suitable means for interpreting the non-linear signals from the two weighing cells is shown. The system shown in the circuit diagram of FIG. 8, which is known as the null-balance system, is widely used for interpreting the weighing cell voltage outputs. In the system, the load cells, which for purposes of continuity will be identified as 31 and 38, corresponding to the references in FIG. 4, are essentially Wheatstone bridges, i.e., in their internal circuit arrangements.

These bridge circuits are arranged in series, and the sum of the voltage output is fed to amplifier 50. The load cells are in series opposition to instrument weighing Wheatstone bridge 51. The voltage response by the instrument weighing bridge 51 is also fed to the amplifier 50. Any difference in the voltage between the bridge circuits of the weighing cells and the instrument weighing bridge is amplified and sent to reversing motor 65 which operates a movable contactor 60. The motor moves the contactor along slide wire potentiometer 61 of the instrument weighing bridge 51 to change the resistance in that bridge and thereby equalize the voltage between the instrument bridge and the weighing cell bridges. The motor continues to operate until the voltage difference between the cell bridges and the instrument weighing bridge is zero, i.e. until a voltage equal to the combined cell output voltage is reached. When the voltage difference has reached zero, the motor stops. This is the null-balance position. The motor, in moving the contactor 60, may also operate a scale pointer such as 62 to indicate the amount of weight of the load on a scale 63 suitably calibrated in pounds.

It will be understood that whereas only two cells are indicated in FIG. 8, by providing additional cell voltage windings, e.g. 75 and 76, any number of cells can be accommodated.

It will be noted that the weighing cells are arranged in series so that the voltage output of the cells, which is compared with the instrument weighing bridge, is the sum of the voltage outputs of the two cells, and, therefore, the combined output is the linear function of the applied load.

The circuit of FIG. 8 is supplied with electrical energy in the following manner:

A fixed input voltage, conveniently an alternating voltage such as a conventional supply of 60-cycle alternating current, may be suplied through the lines 70, 71 to primary winding 73 and is carried from the secondary windings 75, 76 of the transformer 77 through conductors 78, 79, 80, 81 to points 82, 83, 84, 85 of the cell bridges. Strain gauge type resistors 86, 87, 88 and 89 are constituted in arms 90, 91, 92, 93, respectively, of cell 31. Changes in resistance caused by changes in weight cause an unbalance in the bridge which produces an output voltage proportional to the applied load on cell 31. However, as previously noted, this output is non-linear. Similar strain gauge resistors 86a, 87a, 88a and 89a are constituted in arms 90a, 91a, 92a and 93a of cell 38 and changes in resistance cause changes in the output voltage of the cell 38. The cells 31 and 38 are connected in series by the conductor 70 extending from point 94 in cell 31 to point 95 in cell 38. Input conductor 98 to the amplifier 50 is connected to cell 38 at point 96 and conductor 74 connects point 97 of cell 31 to the moveable contactor 60 of the slide wire potentiometer 61. The output voltage passing through conductor 98 is the combined output of cells 31 and 38 which by combination results in an output which is a linear function of the load applied to the cells. This combined output voltage which is imposed upon the amplifier 50, through conductor 98, is compared with the voltage imposed by the instrument weighing bridge 51 passing through the line 99.

The voltage for the instrument weighing bridge 51 is supplied by the transformer 77 through secondary winding 100, and conductors 101, 102. Resistors 103, 104, 105, 106 are provided respectively in the arms 107, 108, 109, 110. The instrument bridge is a potential bridge only. Junction of arms 109 and 110 form a voltage reference point. The slide wire potentiometer 61 provides a means for varying the resistance in the instrument weighing bridge 51. Moveable slider 60 permits changing the potential of conductor 74 with respect to conductor 99. This potential difference is used to oppose the cell-developed voltage. The resistance ratio of bridge arms 107 and 108 is changed by movement of the contactor 60, as indicated above, in response to the operation of the reversible motor 65. The motor 65 may be a suitable type of two-phase reversing induction motor in which one winding of the motor is connected to the amplifier output received through conductors 66, 67 and the other winding is energized through a suitable phase shift network (not shown) which receives an alternating current input from a secondary winding taken from a suitable source such as the transformer 77. The action of the phase shifting network causes a 90° phase displacement between the two winding currents and thereby produces rotation of the motor shaft in response to different voltage inputs. The rotation of the motor may be suitably arranged to mechanically move the contactor 60 of the slide wire potentiometer 61 in a direction to make the amplifier input voltage approach zero. When there is zero voltage, the motor is stopped.

FIGS. 5, 6 and 7 illustrate another form of this invention in which load cells in compression and tension are positioned to support a scale platform of considerable dimensions which is subjected to uneven loading and in which multiple cells are used, it being essential to obtain outputs which will be the linear functions of the applied load.

The apparatus shown in FIGS. 5, 6 and 7 is a railroad weighing scale having a heavy weigh bridge check system without using dead rails. The scale is of the sort used in heavily travelled sections of track.

The apparatus includes a foundation 120 for supporting the weighing apparatus and the track section of the scale, and includes piers 121, 122 to support track rails 123 for the railroad tracks approaching the track scale. Rails 125 constituting the track portion of the scales are supported on suitable cross beams 126 and longitudinal beams 128. Each of the longitudinal beams 128, as shown in FIG. 5, is supported by a tension cell 131 and a compression cell 138. Column 132 of the tension cell 131 is supported by cross beam 133 which beam is mounted on pillars 134, 135, supported on the foundation 120 (see FIG. 6). Column 132 extends upward through the cross beam 133 with a nut 136 threaded on the upper end of the column 132. A suitable bearing plate or bearing washer 137 may be imposed between the nut 136 and the cross beam 133. The lower end of the cell 131 is connected to the longitudinal beam 128 by a stub beam 139 which extends beyond the end of the longitudinal beam 128, as best shown in FIG. 5. The lower tension column 140 extends through the stub beam 139 and is secured to it by a nut 141 threaded on the lower end of the tension column 140. A suitable bearing plate or washer 142 may be placed between the lower side of the beam 139 and the nut 141.

The compression cell 138 may be suitably mounted on the foundation 120 on a plate stand 145. The compression column 146 may be received in abutting relationship to a button plate 147 on the underside of the longitudinal beam 128, as shown in FIGS. 5 and 6.

Means may be provided along the length of the longitudinal beam 128 to substantially prevent longitudinal movement of the track weighing scale. For such means, end checks such as best shown in FIG. 5 may be employed. These include bracket member 150 which is welded or otherwise secured to the lower side of the longitudinal beam 128 and a bracket 151 fixed to the foundation. A check rod 152 extends longitudinally between said brackets and is secured to each by means of adjustable nuts 153, the end portions of the rods 152 being suitably threaded to receive the adjustable nuts 153.

A deck 127 may be provided to cover the pit in which the weighing cells and supporting beams are disposed. The deck is supported by deck beams 129. As shown in FIG. 6, the deck 127 and its supporting beams do not contact the rails or rail supports.

Railroad cars or other rolling stock to be weighed, in either loaded or unloaded condition, are moved onto the tracks 125 from either end of the weighing scale, moving over the tracks 123. When the load to be weighed is in position on the weighing scale, the output from all the load cells supporting the weighing scale is measured and the output is interpreted by suitable means such as the null-balance system described above and illustrated in FIG. 8. The weight may be merely indicated by a suitable dial or may be recorded in any suitable manner.

It will be understood that whereas one track 125 is supported by a comparison cell at the left hand end in FIG. 5 and by a tension cell at the right hand end in FIG. 5, the other track 125 is supported at the first end by a tension cell and at the second end by a compression cell, so that at each end of the weighing scale a compression cell and a tension cell are paired to weigh the weight imposed at that end of the truck. So that if the loading is distributed in different proportions at one end or the other of the track, the different proportions of weight will be equally distributed between a compression cell and a tension cell.

FIG. 7 illustrates the manner in which the two types of cells, i.e. compression and tension, are paired in supporting the weight.

It will be noted that FIG. 7 illustrates a slightly modified arrangement for supporting beam 178 by the tension cell. In the form illustrated in FIG. 7, two yoke members are employed, one yoke member having upright portions 175 fixed to the foundation and a cross arm 176 supported on said cross members. The other yoke member comprises vertically disposed arms 177 fixed to and extending down from the longitudinal beam member 178 and a cross arm 179 fixed to the vertical members 177. The tension cell 180 is positioned between the two cross arms 176 and 179 and tension columns 181, 182 are suitably secured to the cross arms 176 and 179, respectively. The arrangement of the compression cell in FIG. 7 is substantially the same as that shown in FIGS. 5 and 6, compression cell 185 being suitably bolted to the foundation 186 and the compression column 187 extending into abutment with the under side of the longitudinal beam 178.

In the weighing of railroad rolling stock and in other large weighing operations where the weighing platform is of large dimension, the problem of uneven distribution of the weight has caused difficulties in obtaining accurate readings. With the grouping of the load cells in compression and tension arrangements as described, it is possible to assure that the output of the cells from any portion of the scales is an accurate linear function of the applied load because of the combination of the load cells in compression and tension at the various points on the weighing scale. A preferred arrangement for supporting a scale platform for a scale such as the railroad scale is to arrange the cells so that cells loaded in tension are disposed alternately with those loaded in compression both transversely and longitudinally with respect to railroad track.

In the apparatus shown in FIGS. 5 and 6, only two pairs of cells are shown supporting the track scale. However, it will be understood that other pairs of cells may be positioned along the length of the track scale, depending upon the requirements of the track scale.

As an example of an application of the track weighing scale, in an electric track scale with a 55-foot weight bridge having a heavy weight bridge check system without dead rails, for use in heavily travelled sections of track, a suitable weighing system may consist of eight 100,000-pound capacity cells. The indicating and recording instrument may have a capacity of 400,000 pounds × 100 pounds. The load cells are arranged so that cells loaded in tension are paired transversely with cells loaded in compression and cells loaded in tension are disposed alternately with those loaded in compression longitudinally of the track.

It will be understood from the foregoing that the objects of the invention are achieved by the system and apparatus described herein, and that by use of the system of obtaining linearity of load cell output response, as described herein, it is possible to obtain a load cell output which is a linear function of the applied load so that the load may be indicated on an evenly graduated scale and so that the non-linear variation can be eliminated and that multiple cells may be used in pairs to correct any inaccuracies which might arise from an uneven distribution of weight upon a scale having a large platform dimension.

In accordance with the provisions of the patent statutes, I have herein described the principle of operation of the invention, together with the elements which I now consider the best embodiments thereof, but I desire to have it understood that the structure disclosed is only illustrative and the invention can be carried out by other means. Also, while it is designed to use the various features and elements in the combinations and relations described, some of these may be altered and modified without interfering with the more general results outlined.

Having thus described my invention, I claim:

1. Apparatus for weighing a load, comprising two weight-sensitive, load-supporting means, means disposing and supporting said load-supporting means at horizontally-spaced localities for correspondingly supporting a loading body at horizontally-spaced, different regions thereof, one of said load-supporting means comprising a first vertical load-carrying structure connected to said loading body so as to be vertically stressed in compression only by an increase in load on said loading body, the second of said load-supporting means comprising a second vertical load-carrying structure connected to said loading body so as to be vertically stressed in tension only by an increase in load on said loading body, each of said first and second load-carrying structures comprising electrical strain gauge load cell means connected to said load-carrying structures for response to changes in stress thereof, said respective load cell means constituting the sole weight-responsive instrumentality at their respective supporting locality, said compression and tension strain gauge load cell means being electrically energized and responsive and having electrical output characteristics that depart substantially complementarily in respectively opposite directions and in substantially equal amounts from linearity of response, and means electrically connected to said compression and tension strain gauge load cell means for collectively measuring their outputs to determine the weight of the load carried jointly by said first and second load-supporting means, said electrically connected means including means controlled by said compression and tension load cell means for additively combining their electrical outputs so as to effectively cancel out the opposing departures from linearity of response to obtain an output which is linearly proportional to the load applied on them.

2. In apparatus for weighing a load, in combination, two weight-sensitive, load-supporting means, means disposing and supporting said two first-mentioned load-supporting means at horizontally-spaced localities for correspondingly supporting a loading body at horizontally-spaced, different regions thereof, one of said two first-mentioned load-supporting means comprising a first vertical load-carrying structure connected to said loading body so as to be vertically stressed in compression only by an increase in load on said loading body, the second of said load-supporting means comprising a second vertical load-carrying structure connected to said loading body so as to be vertically stressed in tension only by an increase in load on said loading body, each of said first and second load-carrying structures comprising electrical strain gauge load cell means connected to said load-carrying structures for responses to changes in stress thereof, said compression-responsive load cell means constituting the sole weight-responsive instrumentality, in the first one of said two first-mentioned load-supporting means, between the loading body and the second-mentioned supporting means, and the tension-responsive load cell means constituting the sole weight-responsive instrumentality, in the second one of said two first-mentioned load-supporting means, between the load and the second-mentioned supporting means, each of said load cell means comprising strain gauge means which is electrically energized and responsive, said compression and tension load cell means having electric output characteristics that depart substantially complementarily in respectively opposite directions and in substantially equal amounts from linearity of response and means electrically connected to said compression and tension load cell means for collectively measuring their outputs to determine the weight of the load carried jointly by said first and second load-supporting means, said electrically connected means including means controlled by said compression and tension load cell means for additively combining their electrical outputs so as to effectively cancel out the opposing departures from linearity of response to obtain an output which is linearly proportional to the load applied on them.

3. A railway track scale comprising apparatus as defined in claim 2, and including a pair of rails to carry a vehicle to be weighed, said two first-mentioned load-supporting means being respectively connected beneath and in supporting relation to said rails, for supporting a vehicle on the rails substantially equally between the compression-responsive load cell means and the tension-responsive load cell means.

4. A vehicle-weighing scale comprising a structure for bearing a vehicle to be weighed, a plurality of weight-sensitive, load-supporting means, means disposing and supporting said load-supporting means at localities which are horizontally-spaced both transversely and longitudinally with respect to the vehicle-bearing structure, for correspondingly supporting the vehicle at horizontally-spaced, different regions thereof, a first number of said load-supporting means each comprising a first vertical load-carrying structure connected to said vehicle-bearing structure so as to be vertically stressed in compression only by an increase in load on said vehicle-bearing structure, a second number of said load-supporting means each comprising a second verical load-carrying structure connected to said loading body so as to be vertically stressed in tension only by an increase in load on said vehicle-bearing structure, each of said first and second load-carrying structures comprising electrical strain gauge load cell means connected to said load-carrying structures for response to changes in stress thereof, said respective load cells constituting the sole weight-responsive instrumentality at their respective supporting locality, said compression and tension strain gauge load cells being electrically energized and responsive and having electrical output characteristics that depart substantially complementarily in respectively opposite directions and in substantially equal amounts from linearity of response, and means electrically connected to said compression and tension strain gauge load cells for collectively measuring their outputs to determine the weight of the load carried jointly by said plurality of load-supporting means, said electrically-connected means including means controlled by said compression and tension load cell means for additively combining their electrical outputs so as to effectively cancel out the opposing departures from linearity of response to obtain an output which is linearly proportional to the load applied on them, and said second-mentioned supporting means disposing the plurality of load-supporting means relative to the vehicle-bearing structure for supporting the vehicle substantially equally between the compression-responsive cells and the tension-responsive cells.

5. A vehicle weighing scale as defined in claim 4, wherein the load-supporting means having compression-responsive cells are disposed alternately with the load-supporting means having tension-responsive cells, both transversely and longitudinally of the vehicle-bearing structure.

6. A railway track scale comprising structure including a pair of rails for bearing a vehicle to be weighed, a plurality of weight-sensitive, load-supporting means, means disposing and supporting said load-supporting means at localities which are respectively beneath each of the rails and also spaced lengthwise of each, for correspondingly supporting the respective rails at longitudinally-spaced regions thereof, a first number of said first-mentioned load-supporting means each comprising a first vertical load-carrying structure connected to said rails so as to be vertically stressed in compression only by an increase in load on said rails, a second number of said first-mentioned load-supporting means comprising a second vertical load-carrying structure connected to said rails so as to be vertically stressed in tension only by an increase in load on said rails, each of said first and second load-carrying structures comprising electrical strain gauge load cell means connected to said load-carrying structures for response to changes in stress thereof, said compression-responsive load cell means constituting the sole weight-responsive instrumentality in said first number of load-supporting means, between the rails and the second-mentioned load-supporting means, and the tension-responsive load cell means constituting the sole weight-responsive instrumentality in said second number of load-supporting means, between the rails and the second-mentioned supporting means, each of said load cell means comprising spring gauge means which is electrically energized and responsive, said compression and tension load cell means having electrical output characteristics that depart substantially complementarily in respectively opposite directions and in substantially equal amounts from linearity of response, and means electrically connected to said compression and tension load cell means for collectively measuring their outputs to determine the weight of the load carried jointly by said first and second load-supporting means, said electrically-connected means including means controlled by said compression and tension load cell means for additively combining their electrical outputs so as to effectively cancel out the opposing departures from linearity of response to obtain an output which is linearly proportional to the load applied on them, and said second-mentioned supporting means disposing the load-supporting means having compression-responsive cell means alternately with the load-supporting means having tension-responsive cell means both longitudinally of the rails and severally with respect to the individual rails, for substantially equally supporting a vehicle on the track between said compression-responsive cell means and said tension-responsive cell means.

References Cited in the file of this patent

UNITED STATES PATENTS 2,053,560    Janovsky _____ Sept. 8, 1936

(Other references on following page)

UNITED STATES PATENTS

| | | | |
|---|---|---|---|
| 2,338,732 | Nosker | Jan. 11, | 1944 |
| 2,410,139 | Williams | Oct. 29, | 1946 |
| 2,590,626 | Jones | Mar. 25, | 1952 |
| 2,593,169 | Moore | Apr. 15, | 1952 |
| 2,673,082 | Thurston | Mar. 23, | 1954 |
| 2,766,981 | Lauler et al. | Oct. 16, | 1956 |
| 2,771,579 | Ruge | Nov. 20, | 1956 |
| 2,814,946 | Harris | Dec. 3, | 1957 |
| 2,844,027 | Davie | July 22, | 1958 |

FOREIGN PATENTS

| | | | |
|---|---|---|---|
| 468,718 | Canada | Oct. 10, | 1950 |

UNITED STATES PATENT OFFICE
CERTIFICATION OF CORRECTION

Patent No. 2,998,090                              August 29, 1961

Robert G. Watson

It is hereby certified that error appears in the above numbered patent requiring correction and that the said Letters Patent should read as corrected below.

Column 2, line 3, for "roalroad" read -- railroad --; line 9, before "signal" insert -- the --; column 5, line 25, for "weightt" read -- weight --; line 28, for "comparison" read -- compression --; column 6, lines 7 and 8, "weight", each occurrence, read -- weigh --; line 33, for "theroef" read -- thereof --; column 7, line 63, for "verical" read -- vertical --.

Signed and sealed this 17th day of April 1962.

(SEAL)
Attest:

ESTON G. JOHNSON                              DAVID L. LADD
Attesting Officer                               Commissioner of Patents